May 26, 1942.
C. F. HAMMOND
2,284,203
ROTARY SNUBBER
Filed Aug. 25, 1941
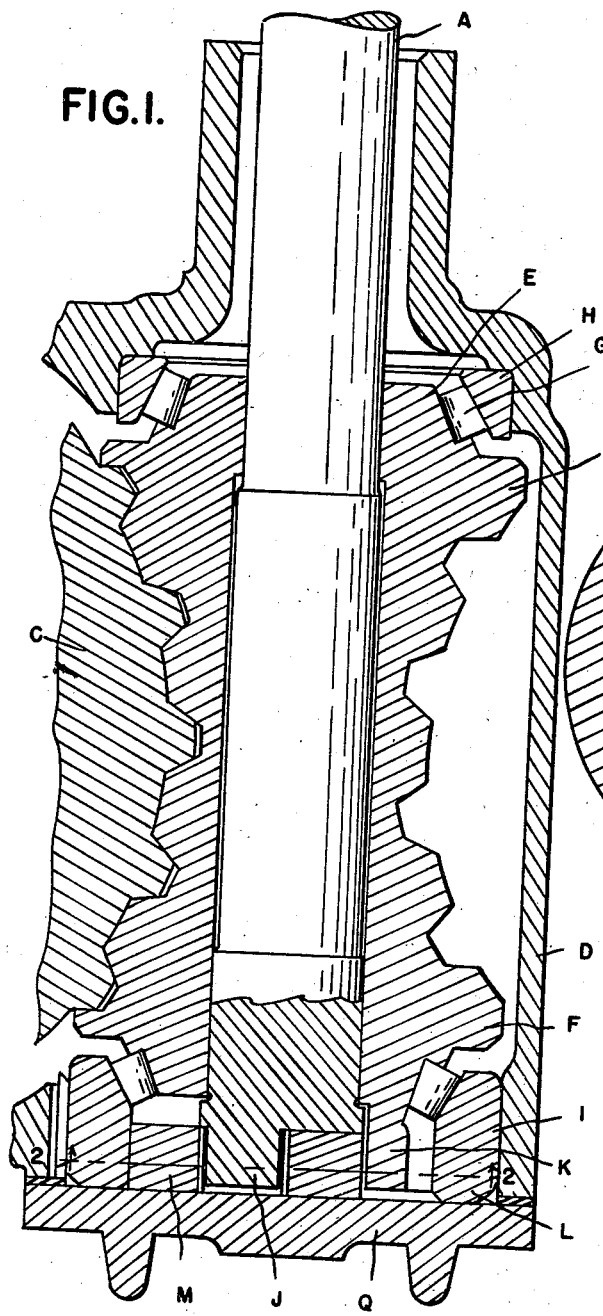
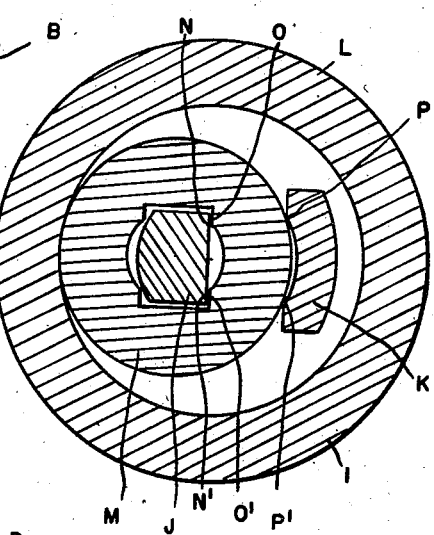
INVENTOR.
CHARLES F. HAMMOND
BY *Whittemore Hulbert & Belknap*
ATTORNEYS Patented May 26, 1942

2,284,203

UNITED STATES PATENT OFFICE 2,284,203

ROTARY SNUBBER

Charles F. Hammond, Grosse Pointe, Mich., assignor to Gemmer Manufacturing Company, Detroit, Mich., a corporation of Michigan Application August 25, 1941, Serial No. 408,243

4 Claims. (Cl. 192—7)

The invention relates to rotary snubbers more particularly designed for use in connection with vehicle steering gears to absorb road shocks transmitted thereto.

It is the object of the invention to obtain a construction which, while permitting a slight reversible action of the mechanism, such as is desirable in a steering gear, will nevertheless prevent the transmission of road shocks to the hand wheel.

It is a further object to obtain a simple construction with relatively few elements other than those forming a necessary part of the steering gear.

With these objects in view, the invention consists in the construction as hereinafter set forth.

In the drawing:

Fig. 1 is a longitudinal section through a steering gear to which my improvements are applied; and Fig. 2 is a cross section on line 2—2 of Fig. 1.

In general construction, the steering gear is of the usual type including the steering stem A, an hour-glass worm B thereon, a worm gear C, and a housing D enclosing the gearing. The worm is provided with conical end extensions E and F which form the inner race members of roller bearings also including the conical rollers G and the outer race members H and I. The latter are seated in recesses in the housing D and are frictionally or otherwise held against rotation therein.

The worm B is not directly keyed to the stem A, but is coupled thereto through the following mechanism:

J is a lug or extension of the stem A, which is located on one side of its axis of rotation. K is a lug or extension of the worm B, spaced from the lug J and located on the opposite side of the axis of rotation. L is an annular extension of the outer race member I which surrounds the lugs J and K and which is of sufficient mass to form a substantially rigid member. M is a circular block or roll centrally apertured to loosely fit the lug J and having a portion which extends between this lug and the lug K and another portion extending into proximity to the inner surface of the annular member L on the opposite side of the axis of rotation from the lug K. The lug J and member M are so fashioned as to form opposed shoulders N, O, N', O' on opposite sides of the axis of rotation, laterally with respect to the common plane of the lugs J and K. The lug K is also preferably slightly cut away, to form laterally spaced bearings P and P' opposite the adjacent face of the member M.

With the construction as thus described, when rotary motion is imparted to the stem A in either direction, one or the other of the pairs of opposed shoulders N, O, N', O' will be brought into contact, and a further movement will contact one or the other of the bearing portions P or P' with the lug K, the member M maintaining contact with the member L. This movement will also slightly displace the member M so as to remove it from frictional contact with the inner face of the annular member L. Thus, the member M forms a couple between the stem and worm so that continued rotation of the stem will transmit a corresponding rotation to the worm. In case the worm is the actuating member, the portion of the member M intermediate the lugs K and J will still form a couple, but the member M will not be removed from contact with the inner face of the member L. However, the direction of force transmitted from the lug K to the member M is at such an angle with respect to the plane of contact between the member M and the member L as to be slightly outside of the angle of friction. In other words, the coefficient of friction between the lubricated surfaces of these members is sufficiently low to permit the member M to slide around the member L and at the same time to transmit rotary motion from the worm to the stem through the medium of the lugs K and J and member M. Thus, the gearing is reversible. On the other hand, a road shock of sufficient magnitude transmitted to the worm and the lug K thereof will cause the member M to seize the contacting surface of the annular member L, thereby locking the mechanism from further rotation. Thus, the rotation of the gearing will be too slight to permit any objectionable swerving of the ground wheels.

The construction of mechanism above described adds little to the cost of the steering mechanism, as the members J, K and L are only slight extensions of the members A, B and I of the usual steering gear, and the member M is the only added element. The cap Q at the lower end of the housing D completes the enclosure of the mechanism.

What I claim as my invention is:

1. A snubber comprising coaxially arranged inner and outer rotary members, eccentric bearings on said members radially spaced from each other and on opposite sides of their common axis, a stationary annular member surrounding said eccentric bearings having an inner surface concentric with said axis, a member carried by the bearing of said inner rotary member having a portion occupying the space between the same and the bearing on the outer rotary member with a slight clearance and another portion extending into proximity to the concentric inner surface of said stationary annular member on the same side of the axis as said inner bearing, the first-mentioned portion constituting a couple between said rotary members effective when driven by the inner member after taking up said slight clearance, and the last-mentioned portion being adapted to frictionally engage the inner surface of said stationary annular member when actuated by said outer rotary member.

2. A snubber comprising coaxially arranged inner and outer rotary members, eccentric bearings on said members radially spaced from each other on opposite sides of their common axis and also extending transversely on opposite sides of their common radial plane, a stationary annular member surrounding said eccentric bearings having an inner surface concentric with said axis, a member carried by the bearing of said inner rotary member having a portion occupying the space between the same and the bearing on the outer rotary member with a slight clearance, and another portion extending into proximity to the concentric inner surface of said stationary annular member on the same side of the axis as said inner bearing, the first-mentioned portion constituting a couple between said rotary member effective when driven by the inner member in either direction of rotation after taking up said slight clearance, and the last-mentioned portion being adapted to frictionally engage the inner surface of said stationary annular member when actuated by said outer rotary member in either direction of rotation.

3. In a steering gear, the combination with a steering stem, of a worm sleeved upon said stem, a non-revoluble annular member adjacent to one end of said worm and stem and concentric with the common axis thereof, lugs projecting from said worm and stem radially spaced from each other on opposite sides of said axis and also extending transversely on opposite sides of their common radial plane, a second annular member loosely surrounding the lug on the stem to be carried thereby having a portion occupying the space between said lugs with a slight clearance, and another portion extending into proximity to the inner surface of said first-mentioned annular member, said first-mentioned portion constituting a couple between said stem and worm effective when driven by the stem in either direction of rotation after taking up said slight clearance, and the last-mentioned portion being adapted to frictionally engage the inner surface of said non-revoluble annular member when actuated by said worm in either direction of rotation.

4. In a steering gear, the combination with a steering stem, of a worm sleeved upon said stem and having a common axis therewith, a casing enclosing said stem and worm, a roller bearing for said worm within said casing including an annular outer race member having a portion extending beyond said worm, lugs projecting from said worm and stem radially spaced from each other and on opposite sides of said axis, said lugs also extending transversely on opposite sides of their common radial plane, a second annular member centrally apertured to loosely engage the lug on said stem and to be carried thereby, said second annular member having a portion occupying the space between said lugs with a slight clearance and another portion extending into contact with the inner surface of said first-mentioned annular member, said first-mentioned portion constituting a couple between said stem and worm effective when driven by the stem in either direction of rotation after taking up said slight clearance, and the last-mentioned portion being adapted to frictionally engage the inner surface of said non-revoluble annular member when actuated by said worm in either direction of rotation.

CHARLES F. HAMMOND.